(12) United States Patent
Anikitchev

(10) Patent No.: US 6,600,605 B1
(45) Date of Patent: Jul. 29, 2003

(54) DIODE BEAM TRANSFORMATION

(75) Inventor: Serguei Anikitchev, Tucson, AZ (US)

(73) Assignee: Spectra-Physics Semiconductor Lasers, Inc., Tucson, AZ (US)

( * ) Notice: Subject to any disclaimer, the term of this patent is extended or adjusted under 35 U.S.C. 154(b) by 0 days.

(21) Appl. No.: 09/967,751

(22) Filed: Sep. 28, 2001

(51) Int. Cl.[7] .................... G02B 27/10; G02B 27/12
(52) U.S. Cl. .................... 359/618; 359/639
(58) Field of Search ................ 359/618, 619, 359/625, 628, 639, 640, 834, 837, 196, 840, 850, 822; 347/241, 243

(56) References Cited

U.S. PATENT DOCUMENTS

| | | | |
|---|---|---|---|
| 5,825,551 A | * 10/1998 | Clarkson et al. | 359/629 |
| 5,986,794 A | * 11/1999 | Krause et al. | 359/222 |
| 6,400,512 B1 | * 6/2000 | Hildebrandt | 359/639 |
| 6,301,054 B1 | * 10/2001 | Van Tran | 359/639 |
| 6,324,320 B1 | * 11/2001 | Goodman | 385/33 |

* cited by examiner

*Primary Examiner*—Georgia Epps
*Assistant Examiner*—Saeed Seyrafi
(74) *Attorney, Agent, or Firm*—Howard R. Popper

(57) ABSTRACT

A prismatic device for reforming the cross section of the beam emitted along a semiconductor laser bar stripe by deflecting successive segments of the emitted beam in directions making acute angles with the longitudinal axis of the emitted beam and redirecting the deflected beam segments through layers of glass into an array of parallel beam segments.

10 Claims, 2 Drawing Sheets

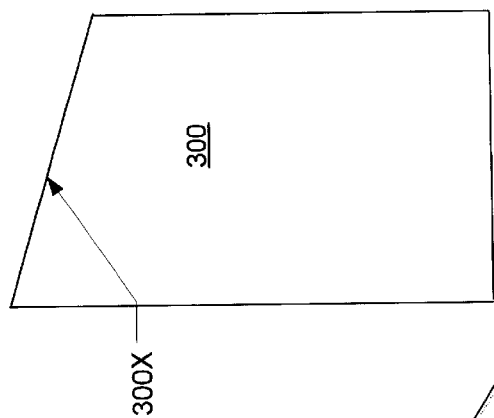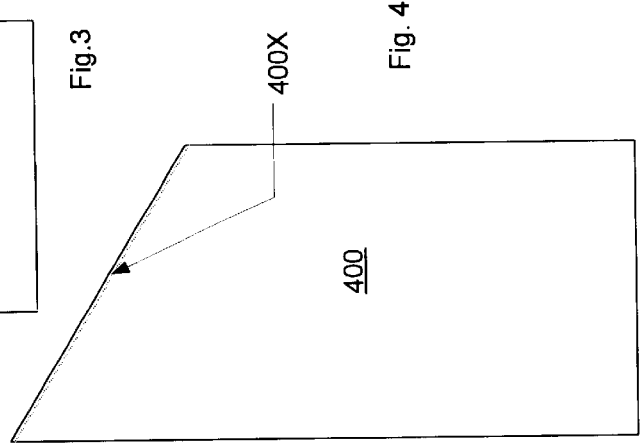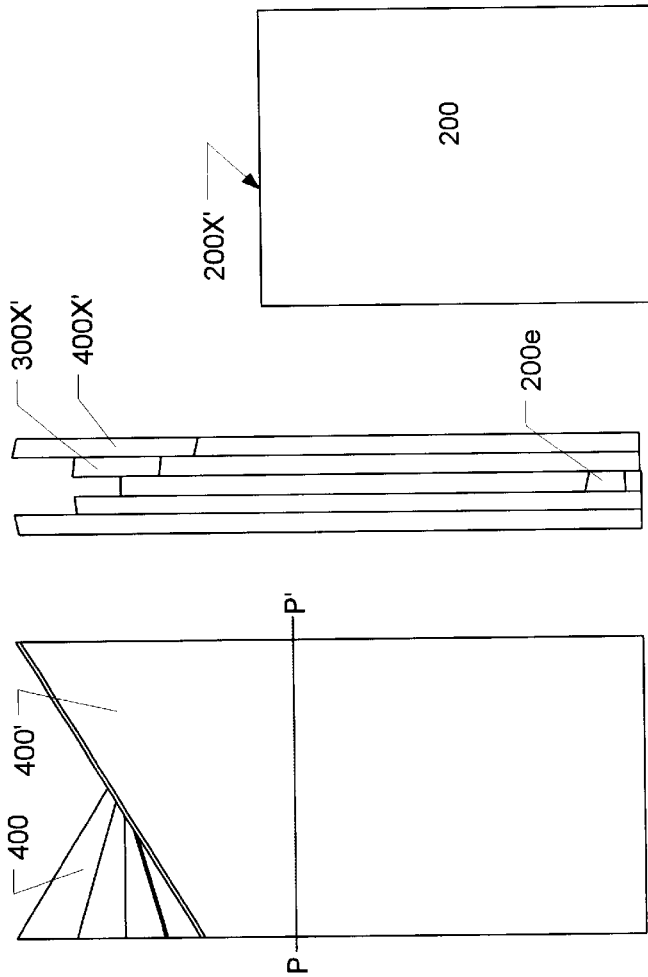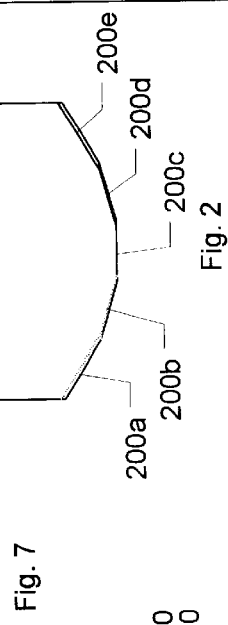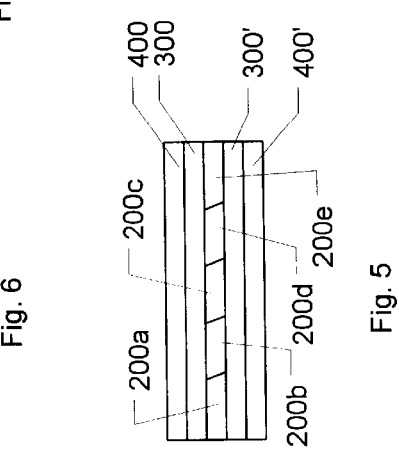

DIODE BEAM TRANSFORMATION

FIELD OF THE INVENTION

This invention relates to laser diodes and, more particularly to apparatus for transforming the shape of the diode beam into a more symmetrical cross-section, i.e., one having a better beam quality.

BACKGROUND OF THE INVENTION

The laser beam from the linear emitting segment or "stripe" of a diode laser is very much wider in the "X" direction (typically 100 to 200 $\mu$m) than in the "Y" direction (typically 1 $\mu$). Most applications, however, require a beam that is more symmetrical in the X and Y directions. In addition to the differences in beam length, the beams exhibit different divergences in the X and Y directions. The divergence angle of the beam in the width ( "slow" or "X" axis) direction of the stripe is small (e.g. 10 degrees) compared to the divergence angle in the perpendicular ("fast" or "Y" axis) direction (e.g., 20 to 50 degrees). It is therefore usually necessary to employ a cylindrical lens to first collimate the beam in the Y direction. Beam quality is a measure of the number of times the beam's divergence exceeds the diffraction limit. In high power applications it is especially desirable to have beam qualities in the X and Y directions that are as equal as possible.

U.S. Pat. No. 5,825,551 discloses an approach to improving beam quality in which a plurality of reflecting surfaces divert the beams emerging from a stripe and reconfigure them into a beam having a "squarer" cross-section. Unfortunately, the beams travel different path lengths, which can be a considerable drawback when, for example, the slow axis of the diode bar or stack is not collimated. Another approach is taken in U.S. Pat. No. 5,986,794 which reshapes radiation from a laser diode bar using sets of parallel optical plates. One set of plates shifts partial beams horizontally, another set shifts them vertically. It would be extremely advantageous, however, to come up with a more compact and easy to align device and which carries out both horizontal and vertical beam shift using just one plate or series of plates, or preferably, with a largely monolithic device.

SUMMARY OF THE INVENTION

In accordance with the principles of the invention, in one illustrative embodiment thereof, a prismatic body exhibits a set of entry panes or chamfers arranged along the width of the laser bar that are tilted at different angles to the optical axis. Advantageously, the prismatic body may be comprised of a stack of flat optical plates, a first plate of which exhibits the set of tilted entry panes to the width dimension of the laser bar. The entry panes on one side of a central pane of the first plate deflect the entering rays upward and to one side of the optical axis into plates stacked above, while those on the other side of the central pane deflect rays downward and to the other side of the optical axis. Plates stacked above and below the first plate receive the deflected rays and convey them to respective exit panes that re-direct and assemble them into parallel beams segments, stacked one above the other. By choosing plate materials having appropriate indices of refraction n, beam path lengths L within the plates, and the tilt angles of the entry and exit panes, the shifts in the X and Y directions $s_x$, $s_y$, respectively needed to effect a desired beam quality (wherein all beams desirably have the same path length L), can be calculated using Snell's law. The system of equations to determine the parameters in question is as follows:

$$\sin(\theta_{1x}) = n \cdot \sin(\theta_{2x})$$

$$\sin(\theta_{1y}) = n \cdot \sin(\theta_{2y})$$

$$L \cdot \cos(\theta_{1y} - \theta_{2y}) \cdot \sin(\theta_{1x} - \theta_{2x}) = S_x$$

$$L \cdot \cos(\theta_{1x} - \theta_{2x}) \cdot \sin(\theta_{1y} - \theta_{2y}) = S_y$$

where $\theta_{1x}$, $\theta_{1y}$ are the angles that an incident beam makes with the normal to an input pane of a plate in the X and Y directions, $\theta_{2x}$, $\theta_{2y}$ are the angles within a plate, n is the refraction index of a plate, L is path length of the beam inside a plate, and $s_x$, $s_y$ are the desired distances of translation along X and Y axis. In one illustrative embodiment, the parameter L is chosen to ensure equal paths for each partial beam, reasonable values are chosen for $s_x$, $s_y$, and the above equations are solved to determine the angular parameters.

BRIEF DESCRIPTION OF THE DRAWING

The foregoing and other objects and features of the present invention will become clearer from the ensuing description when read together with the drawing, in which:

FIGS. 2, 3 and 4 show three illustrative beveled glass plates that may be assembled in accordance with the invention to achieve the effect diagramed in FIG. 1;

FIGS. 5, 6 an 7 are end, top and side views of an assembly using the above-mentioned three types of plates;

DESCRIPTION

Figure 1:
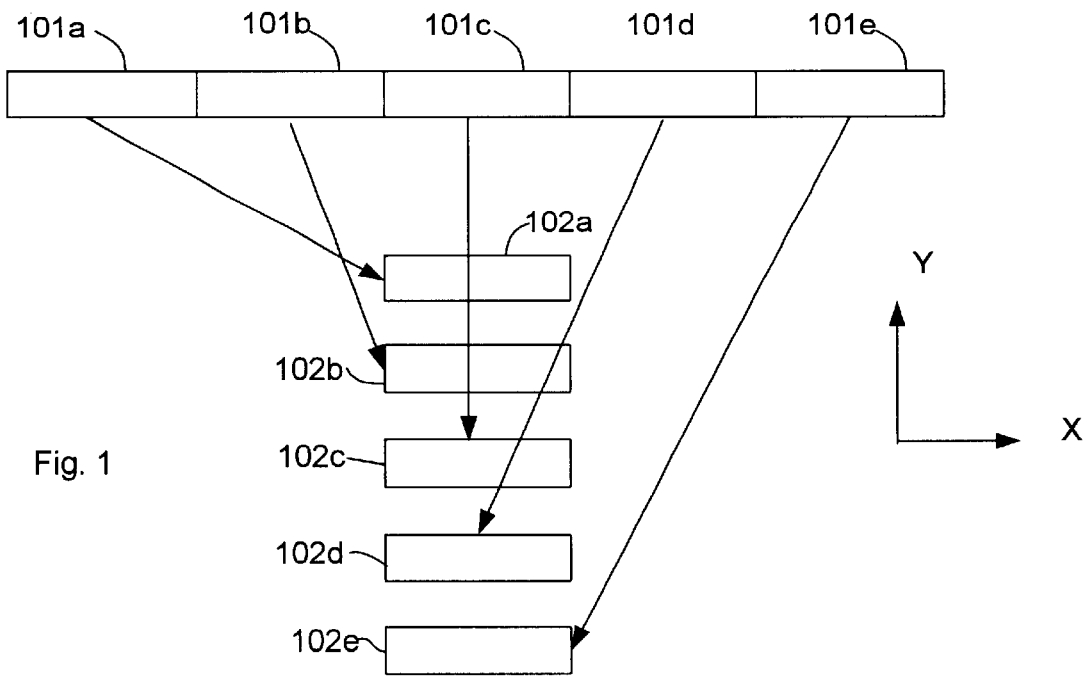
FIG. 1 schematically indicates how the beams emerging along the width of a diode laser bar are to be rearranged to improve beam quality.
Figure 10:
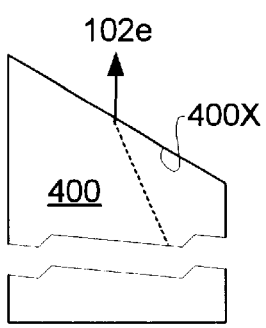
FIGS. 8, 9 and 10 show some of the ray paths through the three plates.
Figure 9:
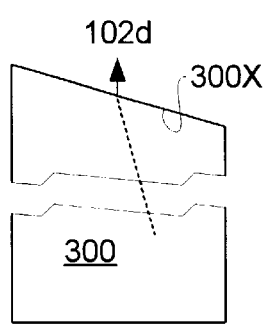

FIG. 1 schematically shows a much-magnified cross section through the beam emerging from a laser bar (not shown). The beam is illustratively divided into successive segments, 101*a*, 10*b*, 101*c*, 101*d* and 101*e* along the "X" axis width of a laser bar. This beam is much wider in the "X" direction than in the "Y" direction and is therefore difficult to use for many purposes. However, if the beam segments 101*a*, 10*b*, 101*c*, 101*d* and 101*e* can be re-arranged into a series of stacked beams arranged in the "Y" axis direction such as shown at 102*a*, 102*b*, 102*c*, 102*d* and 102*e* it will be more symmetrical in the two orthogonal directions. In FIG. 1 it is intended that planes of each of the output segments 102*a* through 102*e* be parallel to the "X-Y" plane of input beam segments 101*a* through 101*e* with only the minimum achievable separation between them in the transversal "Y" direction. The separation shown in FIG. 1 between these planes in the "Y" direction is not intended to be to scale.

Figure 8:
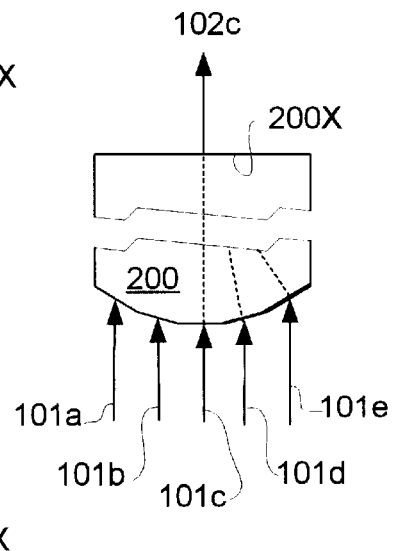

FIGS. 2, 3 and 4 show three illustrative beveled glass plates that, in accordance with the invention, may be assembled to form a prismatic body which achieves the effect diagramed in FIG. 1. Referring to FIGS. 2 and 8, input plate 200 is aligned with its optical axis "Z" perpendicular to the "X" -"Y" plane of the laser bar (not shown). Rays emerging from segments 101*a* through 101*e* of the laser bar enter respective input panes 200*a* through 200*e* of plate 200. As shown in FIG. 8, ray 101*c* enters pane 200*c* of plate 200 which is perpendicular to the optical "Z" axis. Ray 101*c* takes a substantially straight line path through plate 200 and emerges from its far surface 200*c*' (also perpendicular to the "Z" axis), as ray 102*c*. Input panes 200*b* and 200*d* located to the immediate left and right of input pane 200*c*, are chamfered surfaces of plate 200 which are tilted in opposite directions with respect to the optical axis. As a consequence, rays 101b and 101d entering input panes 200b and 200d if plate 200 are deflected in opposite directions to each other. Ray 101b is deflected upward and to the right while ray 101d is deflected downward and to the left.

Input panes 200a and 200e located farther to the left and right of input pane 200c, are also chamfered surfaces of plate 200 but these panes have a greater tilt to the optical axis. Accordingly, ray 101a entering input pane 200a is more sharply deflected upward and to the right than ray 200b. Conversely, ray 101e entering input pane 200e is more sharply deflected downward and to the left than ray 200d.

The chamfered surfaces of input panes 200a through 200e deflect the entering rays in both the "X" and "Y" directions by respective angles $\theta_{ax}$, $\theta_{ay}$ through $\theta_{ex}$, $\theta_{ey}$, measured with respect to the normal of each surface.

Plates 300 and 300' are identical plates that are laterally reversed to each other. Similarly, plates 400 and 400' are identical to each other but laterally reversed. As shown in FIGS. 5–7 the prismatic body of the invention is advantageously made up of an assemblage of 5 plates. Plates 300 and 300' are positioned immediately above and below plate 200 while plates 400 and 400' are positioned immediately above and below plates 300 and 300'. Plates 300 and 400 have chamfered surfaces at the rear, the chamfer of plate 400 being greater than that of plate 300. As a consequence, a ray passing out of plate 400 will be deflected more sharply than a ray exiting plate 300. Corresponding, but opposite remarks apply to the chamfers on plates 300' and 400'.

Beam segment 101c, entering the center surface 200c of central plate 200 undergoes no angular deflection ($\theta_{1cx}=\theta_{1cy}=0$) and emerges as beam segment 102c from exit surface 200X, at the rear of plate 200, with no deflection ($\theta_{2cx}=\theta_{2cy}=0$).

Beam segment 101b enters pane 200b and is deflected upward and to the right through angles $\theta_{1bx}$, $\theta_{1by}$. This beam segment leaves plate 200 and enters plate 300, emerging from its chamfered exit surface 300X at the rear of plate 300. Exit surface 300X deflects the beam through angles $\theta_{2bx}$, $\theta_{2by}$. The deflections by angles $\theta_{1bx}$, $\theta_{1by}$ at plate 200 and $\theta_{1bx}$, $\theta_{1by}$ at plate 300 are such that beam 102b now lies above beam 102c.

Beam segment 101d enters pane 200d and is deflected downward and to the left through angles $\theta_{1dx}$, $\theta_{1dy}$. This beam segment leaves plate 200 and enters plate 300', emerging from its chamfered exit surface 300X' at the rear of plate 300'. Exit surface 300X deflects the beam through an angles $\theta_{2dx}$, $\theta_{2dy}$. The deflections by angles $\theta_{1dx}$, $\theta_{1dy}$ at plate 200 and $\theta_{1dx}$, $\theta_{1dy}$ at plate 300 are such that beam 102d now lies below beam 102c.

Beam segment 101a, enters pane 200a and is deflected upward and to the right through angle $\theta_{1ax}$, $\theta_{1ay}$. This beam segment leaves plate 200, passes through plate 300 and into plate 400, emerging from its chamfered exit surface 400X at the rear of plate 400 as beam 102a. The deflections by angles $\theta_{1ax}$, $\theta_{1ay}$ at plate 200 and $\theta_{2bx}$, $\theta_{2by}$ at plate 400 are such that beam 102a now lies above beam 102b.

Beam segment e, enters pane 101e is deflected downward and to the left through angles $\theta_{1ex}$, $\theta_{1ey}$. This beam segment leaves plate 200, passes through plate 300' and into plate 400', emerging from its chamfered exit surface 400X' at the rear of plate 400' as beam 102e. The deflections by angles $\theta_{1ex}$, $\theta_{1ey}$ at plate 200 and $\theta_{2ex}$, $\theta_{2ey}$ at plate 400' are such that beam 102e now lies below beam 102d.

Let us consider in more detail the path of beam segment 101b. Within plates 200 and 300, which for simplicity will be assumed to have the same index of refraction n. Beam 101b is deflected according to Snell's law and travels a length $L_b$ between entry surface 200b of plate 200 and exit surface 300X of plate 300, where it emerges as beam 102b. Similar but complementary considerations apply to the path of beam segments 101d, 102d which have a path length $L_d$ between entry surface 200d of plate 200 and exit surface 300X' of plate 300'. Likewise, beam segments 101a, 102a passing through plates 200, 300 and 400 have a combined path length $L_a$ between entry pane 200a and exit pane 400X, while $L_e$ is the path length of beam segments 101e, 102e from entry pane 200e to exit pane 400X'. In accordance with one aspect of the invention, $L_a=L_b=L_c=L_d=L_e$.

What has been shown is deemed to be illustrative of the principles of the invention. Needless to say, the number of beam segments and, correspondingly, the number of input segments and the number of parallel plates can be chosen to satisfy the requirements of providing a desired beam quality. The number of such segments (equal to the number of plates) does not have to be odd. For example, if there is a task to "cut" the input beam into 4 partial ones, a design can easily be accommodated which has 2 beams shifted left and up, one beam unchanged and one beam translated to the right and down. The individual plates can be assembled using standard procedures, using optical cement with a refraction index matching the refraction index of the material used for the manufacturing of the plates.

The need for optical cement between the plates can be eliminated if the frontal portions of plates 200–400' are consolidated into a monolithic structure. The monolithic structure would having input surfaces 200a through 200e and a flat planar distal portion (indicated along line P–P' in FIG. 6), orthogonal to optical axis "Z". Line P–P' should preferably be located as close to the rear as possible. Small prisms may then be attached at the rear of the monolithic body, each having one surface adhered to the planar distal portion and an appropriate output surface corresponding to surfaces 200, 300X, 400X, 300X' and 400X'. The advantage of this approach is that beams no longer need drift between the plates, thereby avoiding the condition where a beam intersects the cemented boundary between plates at a shallow angle. Further and other modifications will be apparent to those skilled in the art and may be made without, however, departing from the spirit and scope of the invention.

What is claimed is:

1. Apparatus for reforming the cross section of the beam emitted from a semiconductor laser bar, comprising a prismatic device having;

a. a plurality of input panes tilted with respect to the plane of the stripe of said laser bar, each of the tilted panes being positioned to receive a corresponding segment of the beam emerging from said laser bar, the tilt of said input panes variously deflecting respective beam segments with respect to the plane of said stripe; and b. a plurality of output panes disposed above and below the plane said stripe for redirecting said deflected beam segments into planes parallel to the plane of said stripe.

2. Apparatus according to claim 1 wherein said prismatic device includes a single stack of parallel glass plates having variously chamfered input and output panes.

3. Apparatus according to claim 2 wherein the input panes of one of said plates deflects certain of said beam segments into others of said plates of said stack.

4. Apparatus according to claim 1 wherein said prismatic device comprises a monolithic structure exhibiting said tilted input panes at one end and said plurality of output panes at its other end.

5. Apparatus according to claim 3 wherein the number of said output planes is equal to the number of said input panes and wherein the dimension of said redirected beam segments perpendicular to the plane of said emitted beam is equal to the length of said stripe divided by the number of said segments.

6. Apparatus for reforming the cross section of the beam emitted from a semiconductor laser bar, comprising a prismatic device including a single stack of flat glass plates, one of said plates presenting a plurality of input surfaces variously tilted with respect to the optical axis of said device and the others of said plates in said stack having output facets tilted complimentarily to the planes of said input surfaces.

7. Apparatus according to claim 6 wherein one of said input surfaces is normal to said optical axis, said one of said plates also having an output surface normal to said optical axis.

8. Apparatus according to claim 7 wherein the optical path lengths within said prismatic device between any of said input surfaces and a corresponding one of said output surfaces are substantially equal.

9. A method of reforming the cross section of the beam emitted in the plane of a semiconductor laser bar stripe, comprising deflecting successive segments of the emitted beam at a plurality of angles to the plane of said emitted beam into a prismatic device, and redirecting the deflected beam segments through equal path lengths in said device into an array of parallel planes.

10. A method according to claim 9 wherein the dimension of said redirected beam segments in a direction perpendicular the plane of said emitted beam is substantially equal to the length of said stripe divided by the number of said successive segments.

\* \* \* \* \*